(12) United States Patent
Watkins

(10) Patent No.: US 6,315,180 B1
(45) Date of Patent: *Nov. 13, 2001

(54) CAMERA MOUNT

(76) Inventor: D. Scott Watkins, 470 Elgaen Ct., Roswell, GA (US) 30075

( * ) Notice: Subject to any disclaimer, the term of this patent is extended or adjusted under 35 U.S.C. 154(b) by 0 days.

This patent is subject to a terminal disclaimer.

(21) Appl. No.: 09/527,665

(22) Filed: Mar. 17, 2000

Related U.S. Application Data (63) Continuation-in-part of application No. 09/028,598, filed on Feb. 24, 1998, now Pat. No. 6,116,485, which is a continuation-in-part of application No. 08/919,298, filed on Aug. 28, 1997, now Pat. No. 5,833,101.

(51) Int. Cl.[7] ............................................. B60R 7/00
(52) U.S. Cl. ..................... 224/275; 224/550; 224/553; 224/554; 224/908; 224/929; 396/419; 396/428; 248/177.1; 248/291.1; 248/187.1
(58) Field of Search ................................. 224/275, 929, 224/539, 545, 547, 548, 550, 551, 553, 554, 555, 558, 564, 572, 908; 396/419, 428; 248/177.1, 179.1, 183.2, 298.1, 299.1, 187.1

(56) References Cited

U.S. PATENT DOCUMENTS

| | | |
|---|---|---|
| 277,650 | 5/1883 | Wright . |
| 765,980 | 7/1904 | Mercier . |
| 2,464,067 | 3/1949 | Barker ................. 95/11 |
| 2,481,717 | 9/1949 | Blair ................... 248/183 |
| 2,574,007 | 11/1951 | Anderson ............. 255/51 |
| 2,614,471 | 10/1952 | Markowitz ........... 95/86 |
| 2,794,512 | 6/1957 | Martin ................. 181/0.5 |
| 2,794,612 | 6/1957 | Clifton ................ 248/161 |
| 2,876,688 | 3/1959 | Laue ................... 95/11 |
| 3,128,982 | 4/1964 | Christopher ......... 248/183 |
| 3,141,393 | 7/1964 | Platt ................... 95/1.1 |
| 3,349,679 | 10/1967 | Lohman ............. 95/11 |

(List continued on next page.)

FOREIGN PATENT DOCUMENTS

| | | |
|---|---|---|
| 167405 | 6/1950 | (DE) . |
| 2238993 A | 6/1991 | (GB) . |
| 359011939 A | 1/1984 | (JP) . |
| 410075389 A | 3/1998 | (JP) . |

OTHER PUBLICATIONS

B&H advertisement showing 3000 Pro Camera Stabilization System and Vehicle Camera–Mount devices.
Wolfe Camera Catalog, p. 46, Clamp–Pod device.
Model 700F Eagleye® camera system brochure, Eagleye Technologies, Inc., Rome, Georgia (undated).
Eagleye® System Model 700 System Basic Features brochure, Eagleye Technologies, Inc., Rome, Georgia (undated).
Model 700F System Specification brochure, (2 pages), Eagleye Technologies, Inc., Rome, Georgia (undated).
Eagleye Dispatch, vol. 2, Summer 1995, Eagleye Technologies, Inc., Rome Georgia.

(List continued on next page.)

*Primary Examiner*—Gregory M. Vidovich
(74) *Attorney, Agent, or Firm*—Baker, Donelson, Bearman & Caldwell

(57) ABSTRACT

A camera mount for supporting a camera in a motor vehicle in which an elongated tubular body supports a pivotally mounted camera with the tubular body attached to headrest supports in a seat of a vehicle with the camera disposed substantially centrally relative to a central axis of the vehicle beyond a view point of an eye of an occupant of the seat nearest the centerline of the vehicle such that the imaging apparatus is unobstructed for receiving images by use of the seat.

18 Claims, 6 Drawing Sheets

U.S. PATENT DOCUMENTS

| | | |
|---|---|---|
| 3,515,472 | 6/1970 | Schwitzgebel .................. 352/132 |
| 3,545,710 | 12/1970 | Mooney ........................... 248/183 |
| 3,598,355 | 8/1971 | English ............................ 248/430 |
| 3,752,376 | 8/1973 | Shelton et al. . |
| 3,951,448 | 4/1976 | Hawie .............................. 297/113 |
| 3,970,274 | 7/1976 | Resk ................................ 248/185 |
| 4,029,246 | 6/1977 | Woodruff .................. 224/42.45 B |
| 4,328,915 | 5/1982 | Melton, III . |
| 4,645,320 | 2/1987 | Muelling et al. ................. 354/81 |
| 4,974,807 | 12/1990 | Moineau ......................... 248/539 |
| 5,230,490 | 7/1993 | Sloop .............................. 248/187 |
| 5,260,731 | 11/1993 | Baker, Jr. ......................... 354/81 |
| 5,282,182 | 1/1994 | Kreuzer ............................ 369/21 |
| 5,366,194 | 11/1994 | Finney .......................... 248/218.4 |
| 5,446,659 | 8/1995 | Yamawaki ................. 364/424.03 |
| 5,664,840 | 9/1997 | Stenzel .......................... 297/391 |
| 5,677,979 | 10/1997 | Squicciarini ...................... 386/46 |
| 5,742,859 | 4/1998 | Acker .............................. 396/419 |
| 5,833,101 | 11/1998 | Watkins .......................... 224/275 |
| 5,883,739 | 3/1999 | Ashihara ......................... 359/462 |
| 6,116,485 * | 9/2000 | Watkins .......................... 224/275 |
| 6,231,017 * | 5/2001 | Watkins .................... 248/287.1 X |

OTHER PUBLICATIONS

"The Jo Mount", p. 46, The PI Catalog, Thomas Investigative Publications, Austin, TX 78764, Winter 1997–1998.

Panasonic brochure, AG–750, AG–720, AG710.

1990F (Mustang) Front sear head rest and related parts—Mustang convertible, CPD 2000 Version 10.07, Apr. 1998.

1997 A (Ford), Front seat mechanism—upper half—power—drivers side, CPD Version 10.07, Apr. 1998.

* cited by examiner

CAMERA MOUNT

The present application is a continuation-in-part of application Ser. No. 09/028,598, filed Feb. 24, 1998 issue as U.S. Pat No. 6,116,485, a continuation-in-part of application Ser. No. 08/919,298, filed Aug. 28, 1997, issued as U.S. Pat. No. 5,833,101 on Nov. 10, 1998.

TECHNICAL FIELD

The present invention relates to mounts for cameras. More particularly, the present invention relates to a camera mount for use in vehicles.

BACKGROUND OF THE INVENTION

Movie cameras, and most recently, video tape cameras and recorders, have facilitated the recording and display of action through movies and television. In order to record action scenes, cameras have been mounted on a variety of devices. These devices include stationery mounts for recording movement of objects passing before the camera, as well as mounts which are positioned in moving objects. The ability to position a camera in a variety of locations permits a film director to record a number of different view points from which to observe the action.

Moving vehicles are one type of object which are used in movies and in sports such as automobile racing. Cameras have been mounted on stationery supports for recording motion of automobiles in action scenes. For example, movies involving car chases typically present exterior views of the automobiles in the chase. However, other perspectives of the automobile chase enhance the communication of the action. For example, a camera mounted inside the car shows the perspective view of the driver during the chase scene. Similarly, automobiles used in racing can be shown from a number of perspectives including that of spectators and the drivers. Video cameras have also recently been installed in police cars for recording real time events, such as traffic stops, high speed chases, and the like.

Various devices have been developed for mounting cameras in cars in order to provide perspective views of the action involving the car. For example, a U-shaped bracket has been provided for mounting a video camera to an interior roof of a car near the windshield, whereby the camera view is forward through the windshield in order to provide a record of traffic stops, automobile chases, and the like. Other camera mounts have been used to secure video or television cameras within automobiles, such as race cars to provide the drivers perspective during an automobile race being broadcasted on television. One known device for mounting a camera in a car maintains the camera level with respect to the roads surface regardless of acceleration or gravitational forces. The camera is supported on a pendulum suspended from a gimble and constrained with spring and damping elements which match the vehicle suspension system in order to produce equal and opposite rotations of the pendulum in response to the movements of the vehicle.

Other devices are less complicated. One such device mounts a camera in a protective box which attaches to the rear deck of the vehicle near the back window. Telescoping members connect the box to the rear deck. Coil springs absorb shock in order to dampen vibrations communicated to the camera. Another device provides a channel member with a depending plate at one end. The plate is received in a slot of an upper edge of a car seat which normally receives a tongue or support member of a headrest. A distal end of the channel rests on top of the dashboard of the vehicle. A camera mounts with a bolt through an opening in the channel. An elastic hold-down and stabilizing cord is used to secure the distal end of the channel to the dashboard.

While these devices have generally functioned to support a camera within a car, there are drawbacks to their use. Mounting the camera on a rear deck of a car does not satisfactorily show dashboard information which is useful and important during automobile races. Also this perspective view differs from that seen by the driver. On the other hand, placing the camera closer to the windshield using the bracket which engages the head rest channel may have the camera to far forward to show the dashboard of the car. Also, this bracket is susceptible to vibration as the distal end is not adequately secured. Further, this camera mount occupies one of the head rests and takes the space otherwise occupied by a passenger.

Accordingly, there is a need in the art for an improved camera mount which rigidly secures to an automobile for use in holding a camera for recording images of objects from the automobile. It is to such that the present invention is directed.

SUMMARY OF THE INVENTION

The present invention meets the needs in the art by providing a camera mount for use in a vehicle to support a camera for recording images from the vehicle, in which an elongate rigid member for being attached to a seatback of vehicle has a support surface for disposing an imaging apparatus substantially centrally relative to a central axis of the vehicle beyond a view point of an eye of an occupant of the seat nearest the centerline of the vehicle such that the imaging apparatus is unobstructed for receiving images by use of the seat. A fastener secures a camera to the support surface. Connectors attach the rigid member to respective supports of a headrest of the vehicle in which the camera mount is installed.

In another aspect, the present invention provides a method of securing a camera in a vehicle for recording images from the vehicle, comprising the steps of:

(a) attaching an elongated rigid member to a pair of headrest supports extending from a seatback of a vehicle, the rigid member defining a camera support surface defining an opening for receiving a fastener for engaging an imaging apparatus thereto and defining second openings for receiving brackets to secure said member to the headrest supports;

(b) disposing a imaging apparatus to the support surface substantially centrally relative to a central axis of the vehicle beyond a view point of an eye of an occupant of the seat nearest the centerline of the vehicle such that the imaging apparatus is unobstructed for receiving images by use of the seat.

Objects, advantages and features of the present invention will become apparent from a reading of the following detailed description of the invention and claims in view of the appended drawings.

DETAILED DESCRIPTION OF THE PREFERRED EMBODIMENTS

Figure 1:
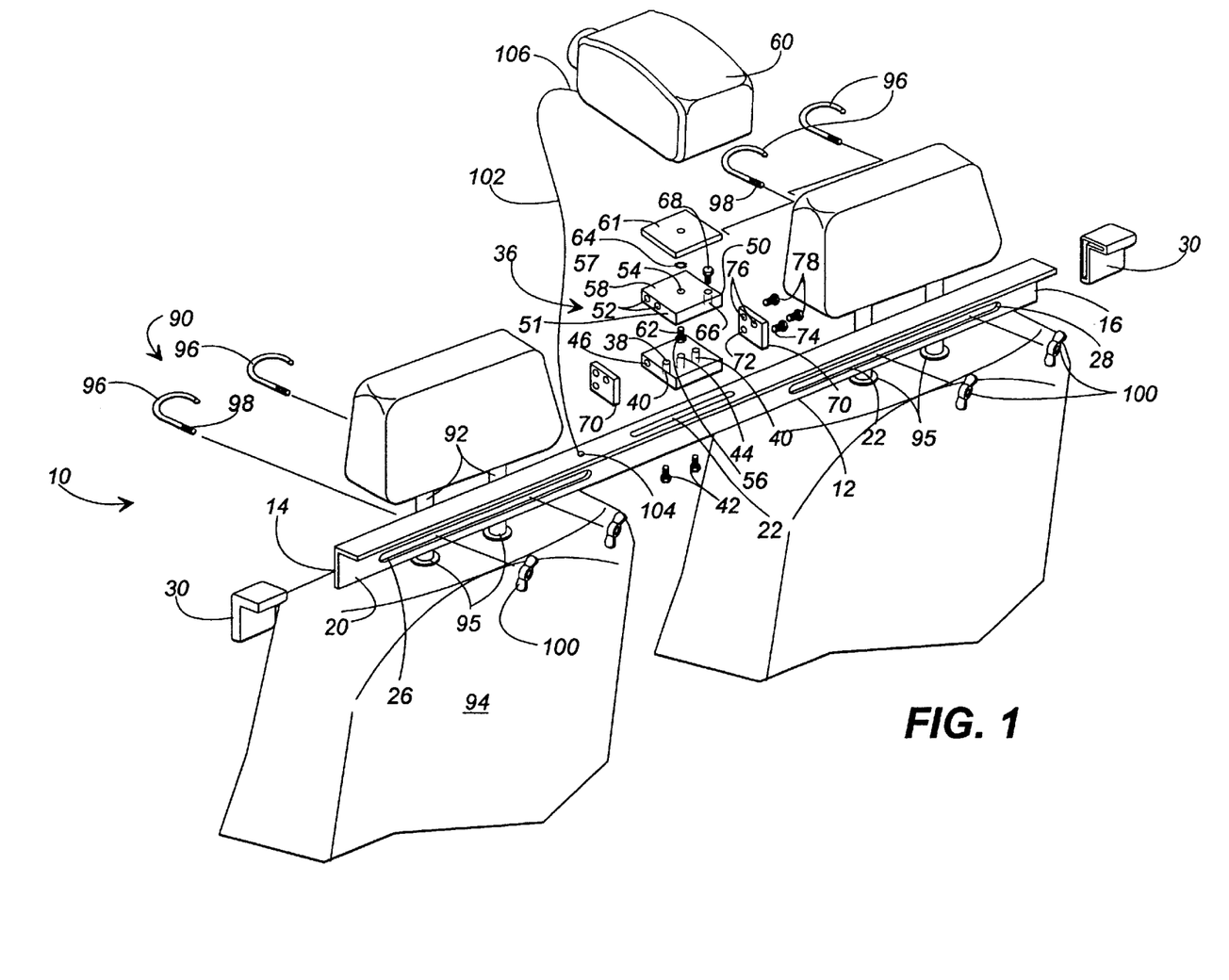
FIG. 1 is a perspective view of a camera mount bar according to the present invention attached to a seat in an automobile.

Referring now in more detail to the drawings in which like parts have like identifiers, FIG. 1 illustrates in perspective view a camera mount bar 10 for use in automobiles, according to the present invention. The camera mount bar 10 comprises an elongate rigid angle member 12 having distal ends 14 and 16. The angle member 12 defines a camera mount surface 18 and a bracket mounting surface 20. The camera mount surface 18 defines an elongated slot 22 which is substantially parallel to a longitudinal axis of the member 12. The slot 22 is preferably positioned central between the distal ends 14 and 16. In an alternate embodiment, the elongate member 12 is a U-shaped channel. In another embodiment, the elongate member 12 is a rectangular tube.

The bracket mounting surface 20 defines a pair of elongated slots 26, 28. The slots 26, 28 are spaced apart and coaxially aligned. The slots are substantially parallel to the longitudinal axis of the elongate member 12. An alternate embodiment (not illustrated) has two pairs of slots 26, 28. The slots 26, 28 are coaxially aligned and the pair of slots 26 are spaced apart in an end portion of the elongate member 12 and the pair of slots 28 are spaced apart in the longitudinally distal end portion thereof. Elastic boots 30 are received on the distal ends 14 and 16.

The elongate member 12 receives a camera mount, generally designated 36. The camera mount 36 comprises a support block 38 having at least one tapped bore 40 which receives a bolt 42 extending through the slot 22 of the elongate member 12 to secure the support block to the elongate member. In the illustrated embodiment, the support block 38 defines a pair of the tapped bores 40, for rigidly connecting the support block 38 to the camera mount surface 18. The support block 38 defines a hole 44 which in the illustrated embodiment is centrally located, for a purpose discussed below. Opposing side faces of the support block 38 define lateral tapped bores 46.

A pivot plate 50 pivotally connects to the support block 38, as discussed below. The pivot plate 50 and the support block 38 pivot relative each other in clam-shell fashion. A first side portion 51 of the pivot plate 50 defines a pair of lateral tapped bores 52 on opposing sides of the pivot plate. A hole 54 is defined in a central portion of the pivot plate 50, for alignment with the hole 44 in the support block 38, for a purpose discussed below. The hole 54 is countersunk on an entry surface for a bolt 56. The hole 54 is also countersunk on the opposing bearing surface 58 that supports a camera 60. The hole 54 is countersunk on the entry surface so the head of the bolt 56 is received within the block to define a smoothly continuous plane on the entry surface. The bolt 56 is received through the hole 54. The bolt 56 defines a groove 62 in a portion of the bolt which extends above the bearing surface 58. A C-ring 64 snaps into the groove 62 to secure the bolt 56 in the hole 54. The countersunk bore in the bearing surface 58 permits the C-ring to be recessed relative to the plane of the bearing surface 58. A second side portion 57 opposite the first side portion 55 defines a hole 66 tapped through the pivot plate 50. The hole 66 receives a threaded bolt 68.

A pair of pivot blocks 70 pivotally connect the pivot plate 50 to the support block 38. The pivot blocks have a first bore 72 which receives a bolt 74. The bore 72 aligns with one of the tapped bores 46 in the support block 38. The pivot block 70 also defines a pair of second bores 76 which receive bolts 78. The pair of bores 76 align with the pair of tapped bores 52 in the pivot plate 50.

A bracket generally 90 connects the elongate member 12 to headrest supports 92 in a seat back 94 of an automobile. The headrest supports 92 are conventionally received in slots 95 in the seat back 94. In the illustrated embodiment, the bracket comprises a J-hook 96 having a distal end 97 and a threaded end 98. (An alternate embodiment of the bracket 90 is discussed below.) The threaded end 98 of the J-hook 96 extends through the respective slot 26 and 28 and receives a wing nut 100 for securing the J-hook to the elongate member 12. The distal end 97 of the J-hook likewise extends through the respective elongate slot 26, 28, whereby the J-hook 96 enwraps the headrest support 92. The wing nut 100 is tightened on the threaded end 98 in order to rigidly secure the J-hook 96 around the headrest support 92 and thereby rigidly connect the elongate member 12 to the headrest supports 92.

One embodiment of the camera mount bar 10 includes a strap 102 that connects at a first end 104 to the elongate member 12. A free second end 106 connects to a connector on the video camera 60.

The camera mount 36 is assembled by bolting the support block 38 to the pivot blocks 70. The tapped bore 46 in a support block 38 aligns with the bore 72 in the pivot block 70. The bolt 74 engages the tapped bore 46 and connects the pivot block 70 to the support block 38. The bolt 56 is inserted in the hole 54 of the pivot plate 50. The C-ring 64 engages the groove 62 to secure the bolt 56 in the hole 54. The pivot plate 50 is then connected to the pivot blocks 70 by engaging the bolts 78 in the aligned pairs of bores 76 and tapped bores 52. The camera mount assembly 36 is then connected to the camera mount surface 18. The bolts 42 extend through the slot 22 into the tapped bores 40 of the support block 38. The camera mount 36 is slidingly positioned along the slot 22 and the bolts 42 tightened to rigidly connect the camera mount to the camera mount surface of the elongate member 12.

The camera mount bar 10 is then attached to the seat backs 94 in an automobile. The J-hooks 96 extend through the respective slots 26, 28 and enwrap the headrest supports 92 as discussed above. The wing nuts 100 threadably engage the threaded ends 98 in order to rigidly secure the J-hooks around the headrest supports, whereby the camera mount bar 10 is rigidly connected to the seat back 94. The slots 26, 28 facilitate positioning the camera mount bar 10 in different automobiles, including compacts and larger automobiles. Also, the camera mount bar 10 connects to bucket seats as well as bench seats.

The camera 60 is connected to the camera mount 36 by threading the bolt 56 into a tapped bore in the camera 60. An adjuster, such as a screw driver extends through the aligned hole 44 in order to turn the bolt 56. It may be appreciated that a resilient pad 61 is gainfully positioned between the camera 60 and the bearing surface 58 of the pivot plate 50, for dampening vibrations. In the embodiment having the strap 102, the second end 106 is connected to the camera 60.

Typically, seat backs 94 are disposed at a angle, or are adjustable whereby the headrest supports 92 are disposed at an obtuse angle relative to the chassis of the automobile. The camera mount bar 10 accommodates this by permitting the pivot plate 50 to adjust the tilt of the camera 60 for a straight-on shot. The bolt 68 enters the tapped bore 66. The leading end of the bolt 68 bears against the surface of the support block 38 in order to tilt the pivot plate 50 to an acute angle with respect to the support block 38, whereby the camera 60 can be positioned for a straight-on view through the windshield of the automobile. Further, the camera 60 is readily disposed at an angle, such as towards the driver of the passenger, or aimed outwardly of the passenger window or rearwardly through the back window. The pivot plate 50 is locked in the selected position by tightening the bolts 74.

The camera mount 36 can be selectively positioned by sliding the camera mount 36 along the slot 22. In this way, the camera 60 can be positioned closer to the driver in order to record the instrumentation displayed on the instrument panel of the automobile. Alternatively, the camera 60 can be positioned remote from the driver in order to provide a passenger's view of the operation of the motor vehicle. Further, the elongate slots 26, 28 facilitate connecting the camera mount 36 in a selected position whereby a distal end 16 of the camera mount bar 10 extends outwardly of a passenger window in the automobile. A second slot (not illustrated) defined in the camera mount surface 18 in the distal end portion of the camera mount bar 10 facilitates mounting the camera 60 outwardly of the automobile.

Figure 2:
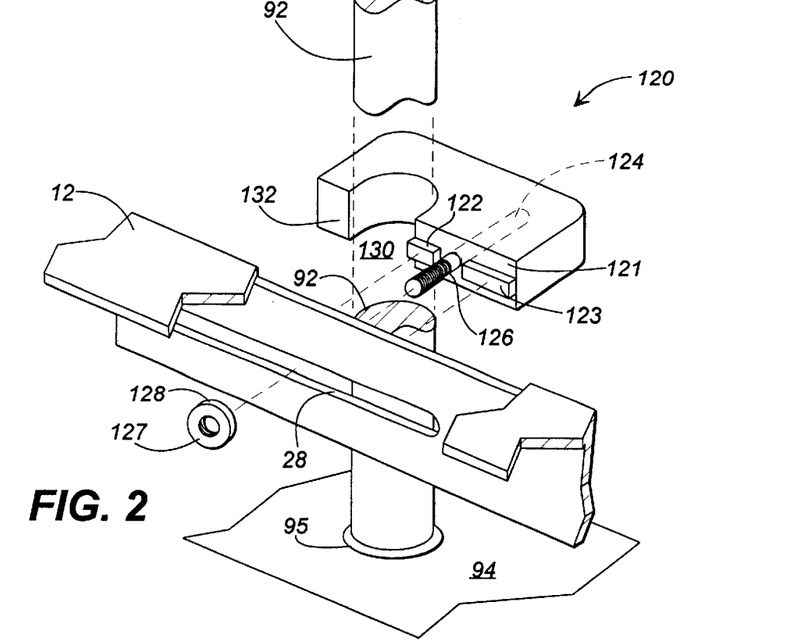
FIG. 2 is a perspective view of an alternate embodiment of the bracket for connecting the camera mount bar illustrated in FIG. 1 to the headrest support of a seat in an automobile.

FIG. 2 is a perspective view of a preferred embodiment of the bracket for securing the rigid angle member 12 to the headrest supports 92. A bracket 120 comprises a block having a face 121 which abuts the face of the bracket mounting surface 20. A pair of lands 122, 123 project from the face 121. The lands are sized to extend through the slots 26, 28 in the member 12. The block 120 also defines a bore 124 for receiving and securing a threaded connector 126 which also extends through the respective slots 26, 28. A fastener 127 threadingly engages the connector 126 to secure the block 120 to the member 12. In the illustrated embodiment, the fastener 127 has a knurled surface 128 for grasping and rotating by hand. A notch 130 is defined in the block 120 for receiving the headrest support 92 (shown in phantom line). A distal end 132 of the block 120 defines a J-hook for substantially encircling the headrest support 92 within the notch 130.

In use, the elongate member 12 is positioned against the headrest supports 92 as illustrated in FIG. 1. The bracket 120 is positioned against the mounting surface 20 with the headrest support 92 entrapped within the notch 130. The lands 122, 123 and the connector 126 extend through the respective slot 26, 28. The fastener 127 threads onto the connector 126. The fastener 127 is tightened to rigidly connect the block 120 to the angle member 12 and thereby rigidly connect the camera mount bar 10 to the headrest supports 92. A bubble level attached to the elongate member 12 helps to orient the member horizontally.

Figure 3:
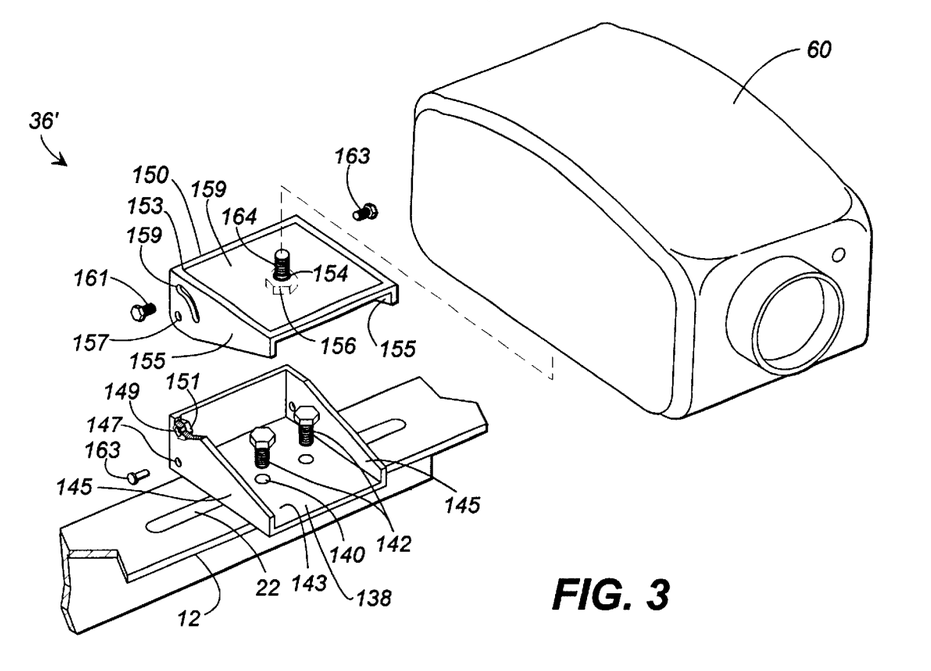
FIG. 3 is a perspective view of a preferred embodiment of the camera mount according to the present invention.

FIG. 3 is a perspective view of a preferred embodiment of the camera mount 36'. In this embodiment, the camera mount also forms a pivotable clam-shell structure with a support block 138 and a pivot plate 150. At least one bore 140 which receives a bolt 142 that extends through the slot 22 of the elongate member 12, for securing the support block to the elongate member. In a preferred embodiment, a pair of bores 140 and bolts 142 cooperatively connect the support block 138 to the support surface 18. The support block 138 comprises a metal plate folded to define a base 143 and a pair of sidewalls 145 and having a broad U-shaped appearance in cross-sectional view. Each sidewall 145 defines an opening 147. At least one of the sidewalls 145 also defines a second opening 149 to which a self-clinching nut 151 is secured on an inner face, for a purpose discussed below.

The pivot plate 150 pivotally connects to the support block 138, as discussed below, so that the block and the plate pivot open and closed in a clam-shell manner. The pivot plate 150 defines a top surface 153 and a pair of sidewalls 155 having a broad U-shaped appearance in cross-sectional view. The sides 155 each define an opening 157 which align with the respective openings 147 in the support block 138. At least one of the sides 155 defines an arcuate slot 159 which aligns with the opening 149 in the support block 138. A threaded connector 161 is received through the slot 159 and into the nut 151 for securing the pivot plate 150 at a selected angle relative to the elongate member 12. A hole 154 is defined in the upper surface of the pivot plate 150 and receives the bolt 156 for connecting to the video camera 60. The head of the bolt 156 is rotated by the reaching into the cavity between the support block 138 and the pivot plate 150. A resilient pad 159 is preferably received on the pivot plate 150 to dampen vibration communicated to the video camera 60. In a preferred embodiment, the bolt 156 is held in the hole 154 by the C-ring 164 received in the groove in the bolt, as discussed above (not illustrated in FIG. 3).

The support block 138 connects to the pivot plate by aligning the sidewalls 155 outwardly of the sidewalls 145 and inserting a pin 163 through the aligned holes 157 and 147 on each side of the camera mount 36. The pin 163 preferably is a nylon button with a stem and a knob at a distal end. The threaded fastener 161 passes through the arcuate slot 159 and into the nut 151 to secure the pivot plate 150 at a selected angle relative to the elongate member 12. The bolts 142 extend through the openings 140 and engage nuts to secure the support plate 138 at a selected position along the slot 22 in the elongate member 12.

Figure 4:
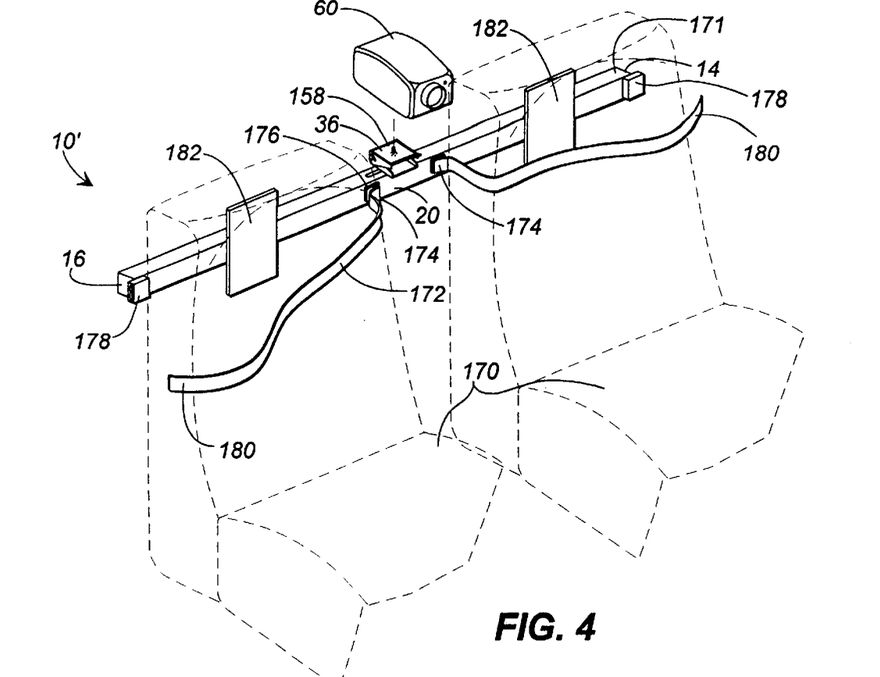
FIG. 4 is a perspective view of an alternate embodiment of the camera mount bar for use in automobiles which do not have headrest supports in the seats.

FIG. 4 is a perspective view of an alternate embodiment of the camera mount bar 10' for installation in automobiles which do not have separate, extendable headrests with supports 92. In the illustrated embodiment, two bucket seats 170 are illustrated in phantom to show the environment of the alternate embodiment. An elongate rigid member 171 includes the elongate slot 22 in the camera mounting surface 18. However, the support surface 20 does not include the elongate slots 26 and 28. Rather, a pair of elongate flexible straps 172 are attached at a first end 174 to the support surface 20. In the illustrated embodiment, the first end 174 is attached intermediate the longitudinal ends 14 and 16 of the elongate member 171. The pair of ends 174 are preferably spaced apart, although that is not necessary. The strap 172 is preferably a strong woven fabric, such as a seat belt material. The first end 174 loops through an opening in a metal plate 176 and is sewn together to securely attach the end to the metal plate. The metal plate 176 is rigidly connected to the support surface 20 with rivets, bolts, or other fasteners. A pair of buckles 178 rigidly attach to the support surface 20 near the longitudinal distal ends 14 and 16 of the elongate member 12. The buckles 178 are adapted to receive and securely engage the strap 172 by passing a free end 180 through the buckle. The camera mount 36', such as the embodiment illustrated in FIG. 3, is connected to the slot 22 of the elongate member 12.

A pair of plates 182 connect to the face of the support surface 20 in spaced-apart relation. In the illustrated embodiment, the plates 182 are rectangular metal plates oriented to have a longitudinal axis substantially perpendicular to a longitudinal axis of the elongate member 171. The plates 182 bear forcibly against the back of the seat 170 in the car in which the alternate embodiment camera mount 10 is installed. The elongate member 171 extends between the seats 170 on the backside of the seats. The member 171 is held in position as the pair of straps 172 are looped around the seats. The free end 180 is received through the buckle 172 and the excess length of the strap 172 is pulled in order to cinch the strap tightly about the seat 170. The buckle 178 holds the strap 172 in a tightly cinched manner, whereby the elongate member 171 is securely held to the seats 170. The plates 182 bear against the back of the seats. The camera mount 36 is attached as discussed above to the elongate slot 22 in the elongate member 12. The camera 60 is attached to the camera mount 36, as discussed above.

Figure 5:
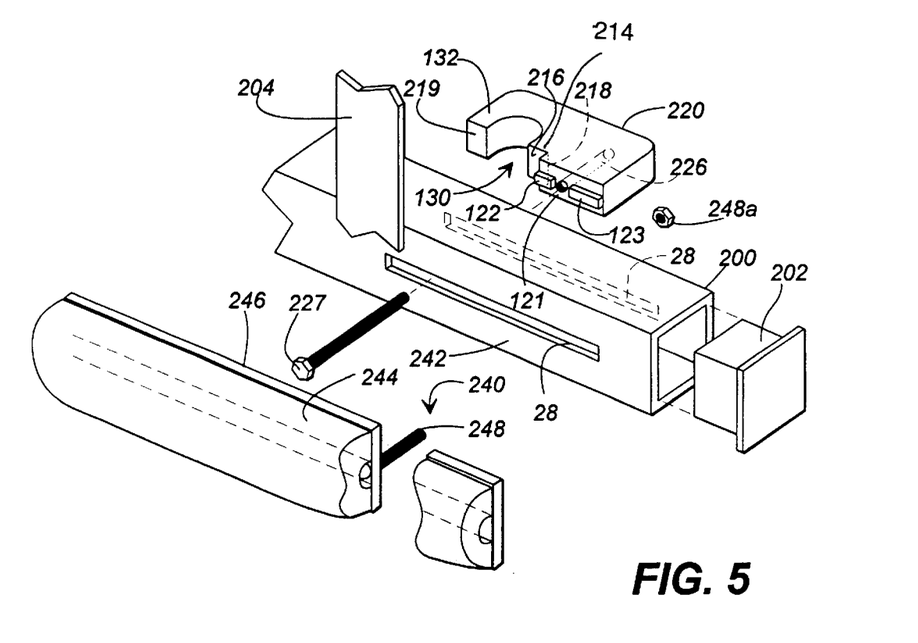
FIG. 5 is a perspective view of an alternate embodiment of a bracket for securing the camera mount to rectangular supports for headrests in the seats.

FIG. 5 is a perspective view of an alternate embodiment of the camera mount and bracket according to the present invention. In this embodiment, the camera mount comprises an elongate tube 200 which is readily extruded and machined to define the slots 22 and the slots 26, 28 in opposing faces of the tube. A flexible plug 202 inserts into each distal end of the tube 200. A bracket 220 connects the camera mount 200 to the rectangular-type supports 204 for headrests found in some automobiles. The bracket 212 incorporates an improvement over the bracket 120 illustrated in FIG. 2. A notch 214 is machined in the bracket 220 between the arcuate notch 130 and the face 121. The notch 214 defines a face 216 and a side face 218. The face 216 provides a planar surface for abutting against a face of the headrest support 204. The side face 218 defines a stop for receiving a side edge of the headrest support 204. The side accordingly is defined by a first face 216 and a second face 121 which are parallel to a plane on a longitudinal axis of the block. The first face 216 is preferably disposed in a plane closer to the longitudinal axis than the plane in which the second face 121 is disposed. The side of the block thereby defines the notch 214 for receiving a portion of the rectangular headrest support 204. In the illustrated embodiment, the distal end 132 of the block 220 defines a face 219 which is substantially coplanar with the face 216 whereby the face of the headrest support 204 seats squarely against the bracket 220 in the notch 214. It is to be appreciated that the improved bracket 220 having the notch 130 is readily attached to tubular supports as well as rectangular support for headrests. The lands 122, 123 extend laterally from the face 121. A threaded bore 226 is defined in the bracket 220 extending from the face 121. In the illustrated embodiment, the bore extends only partially through the block. A fastener 227 engages the bore 226.

The bracket 212 operates in a manner similarly to the bracket 120 discussed above. The camera mount 200 is positioned against the headrest supports 204 as illustrated in FIG. 5. The bracket 220 is positioned against the camera mount 200 with the headrest support 204 received in the notch 214. The side edge of the support 204 bears against the side 218. The surfaces 214 and 219 bear against the support 204. The lands 122, 123 extend through the slot 28 of the tubular camera mount 200. The fastener 227 threads into the bore 226 to rigidly connect the block 220 to the camera mount 200, and thereby rigidly connect the camera mount to the headrest supports 204.

FIG. 5 further illustrates a cushion pad 240 that attaches to a rear face 242 of the camera mount 200. The pad 240 includes a cushion member 244 attached to an elongate backing board 246. In the illustrated embodiment, the cushion member 244 is made of an extruded resilient material and defines a C-shape in cross-sectional view. The member 244 attaches with an adhesive to the backing board 246. A plurality of threaded connectors 248 extend laterally from the backing board 246 on a side opposite the cushion member 244 for connecting the cushion pad 240 to the camera mount 200. In use, the threaded connectors 248 extend through the slots 26, 28 and receive nuts 248a on the opposing side of the camera mount 200 for rigidly connecting the cushion pad to the camera mount. The member 44 provides a cushioned surface on the rear face of the camera mount for protecting a person operating the camera from a back seat of the automobile against bumps or bruises. The cushion pad 240 also can be attached to a front face of the camera mount 200.

Figure 6:
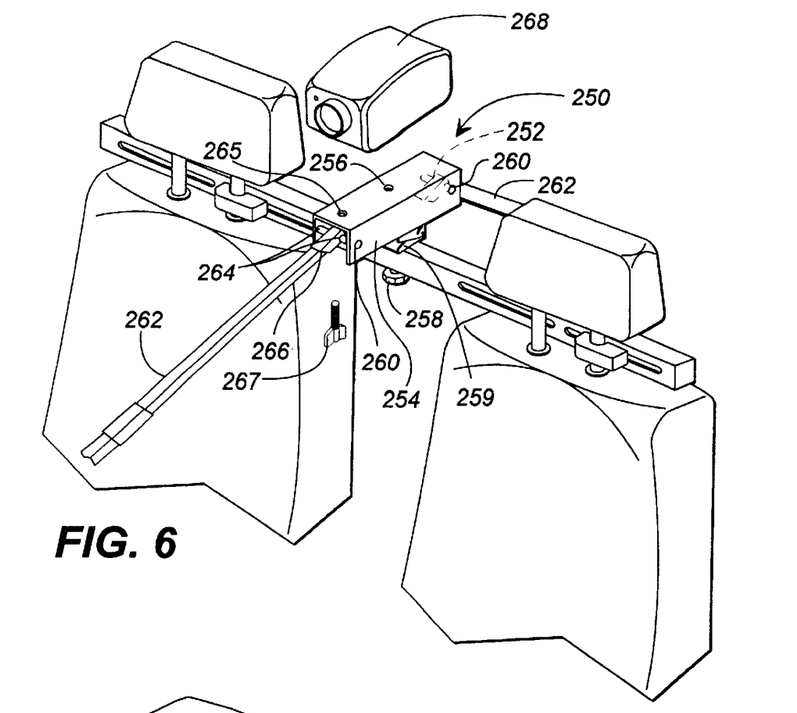
FIG. 6 is a perspective view of an alternate embodiment of the camera mount having a camera support for stabilizing larger cameras.

FIG. 6 is a perspective view of an alternate embodiment of a camera support 250 for the camera mount 200, for holding larger cameras. The camera support 250 provides increased stability of the camera during operation of the automobile. The camera support 250 has a support plate 252 that defines a planar surface for supporting a camera. A pair of lateral sides 254 extend downwardly from the plate 252. The support plate thereby defines a U-shape in cross-sectional view. The support plate 252 defines a central threaded bore 256 for receiving a fastener 258 therein for connecting the support plate to the camera mount 200. In the illustrated embodiment, the support plate 252 connects to a pivot plate 259, such as the pivot plate 150 or other such pivot plates disclosed herein. The pivot plate separately connects with the bolt 258 to the camera mount 200. The pivot plate 259 permits angling the camera in order to orient the camera in a horizontal plane, as discussed below.

At least one pin connects to the side 254. The illustrated embodiment includes a pair of pins 260 that connect between the lateral sides 254 in respective distal end portions of the support plate 252. A telescopically extendable tube 262 attaches to each of the pins 260. A pair of bearings 264 dispose the tube 262 centrally on the pin 260. A connector 266 connects the tube 262 to the pin 260. The pin 260 is pivotable between the sides 254, whereby the telescopic tube 262 can be disposed extending from the support plate 250 at a range of selected angles. The support plate 252 further defines a bore 265 for receiving a fastener 267 for connecting a camera 268 to the support plate. In an alternate embodiment, the support plate 252 comprises an angle member having one lateral side, which is useful with lighter, smaller cameras. In this alternate embodiment, the pin 260 extends laterally as a cantilever from the side 254.

In use, the camera support 250 is attached to the camera mount 200, either directly or preferably with one of the pivot plates disclosed herein. A camera is attached with the fastener 267 to the support plate 252. The extendable tube 262 is extended at a selected position to bear the distal end against a surface of the automobile, such as the seat or floor board in the back of the automobile. An alternate embodiment (not illustrated) uses only one of the extendable tubes, although two are preferred in order to provide forward and rear support for stabilizing heavier, larger cameras attached to the camera mount 200.

Figure 7:
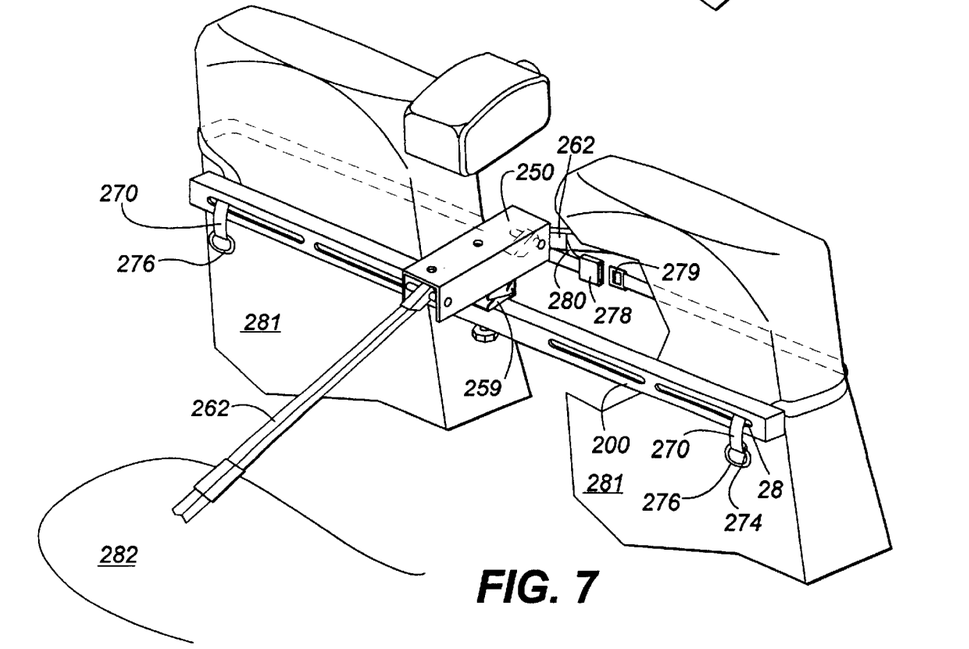
FIG. 7 is a rear perspective, partially cutaway view illustrating the camera support shown in FIG. 6 with straps to secure the camera mount to the seats of an automobile.

FIG. 7 illustrates a rear perspective, partially cutaway view of the camera support 250 and camera mount 200 attached to seats 281 with straps 270 which encircle the seats. The straps 270 have distal ends 272 that fold over and define loops 274 by sewing the end to the overlapped portion. The loop 274 ends of the straps 270 extend through the slots 26, 28 in the camera mount 200. A C-ring 276 is received on each of the loops 274, which C-ring bears against a side face of the camera mount 200, for securing the straps 270 to the camera mount. A matable portion of a buckle 278 and a clip 279 attach to the respective other ends of the straps 270. The buckle 278 and clip 279 are conventional, and a portion 280 of the strap 270 extends from the buckle for being pulled to cinch the straps 270 tightly around the seats 281. The telescoping tubes 262 extend and bear against surfaces, such as the floorboard 282, to stabilize the camera connected to the camera support 250. In an alternate embodiment, the strap is a single continuous ribbon of fabric material with a buckle at one end. The distal end of the strap extends through the camera mount 200, across the seats, and back through the camera mount. The distal end is threaded into the buckle and cinched tightly.

Figure 8:
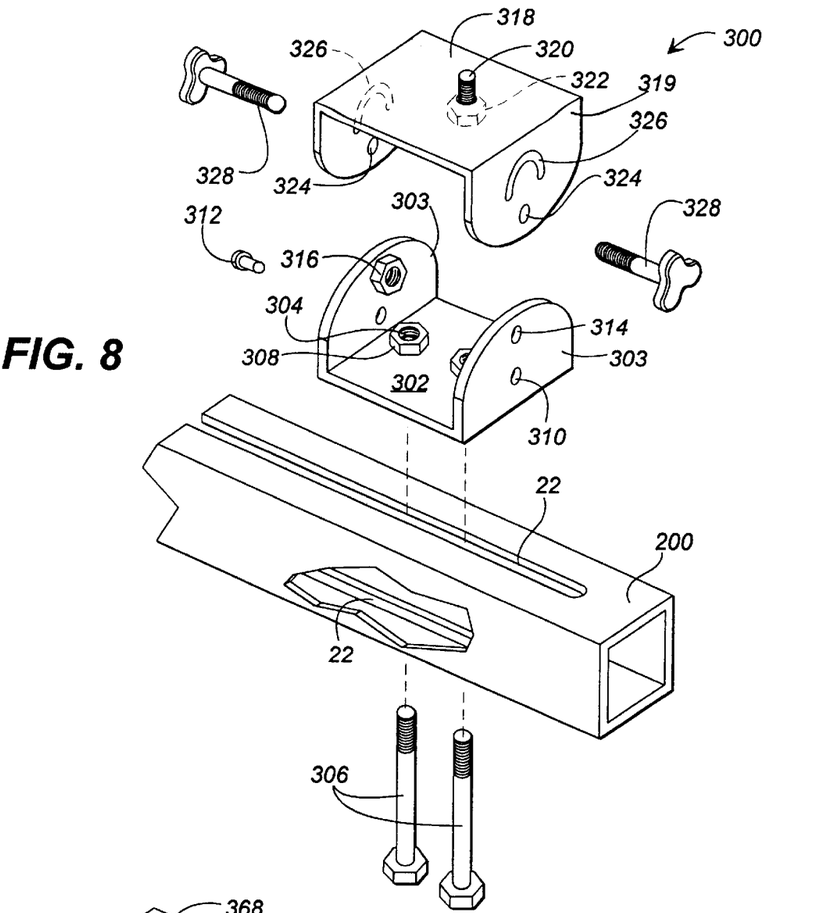
FIG. 8 is a perspective view of an alternate embodiment of a support block for supporting a camera on the camera mount.

FIG. 8 is a perspective view of an alternate embodiment of a pivot block 300 for supporting a camera at an angle on the camera mount 200. The pivot block 300 comprises a base plate 302 with a pair of opposing sides 303 that extend upwardly. The base plate 302 defines a pair of holes 304 for receiving fasteners 306 that extend through the slots 22 for attaching the pivot block 300 to the camera mount 200. Clinch nuts 308 attach to the base plate 302 coaxial with the holes 304 for engaging the fasteners 306. The sides 303 each define a lower hole 310 for receiving a pin 312 and an upper hole 314. Clinch nuts 316 attach to interior faces of the sides 303 in alignment with the holes 314.

The pivot block 300 also includes an upper pivot plate 318 having a pair of opposing sides 319. The plate 318 defines an opening 320 for receiving a threaded fastener 322 held therein conventionally by a C-ring received in a groove in the fastener. The fastener 322 connects the camera to the pivot block 300. A resilient pad (not illustrated) received on the pivot plate 316 dampens vibrations. The sides 319 each define a hole 324 and an arcuate slot 326. A threaded pin 328 extends through the slot 326 and the hole 314 to engage the clinch nut 316. The pins 312 extend through the holes 310 and 324 and provide for selective arcuate movement of the upper pivot plate as guided by the pin 328 traveling in the slots 326.

In operation, the pivot plate 318 connects to the base plate 302 by overlapping the sides 303, 319 and inserting the pins 312 in the aligned holes 310, 324. The pins 312 permit the pivot plate 318 to pivot relative to the base plate 302. The threaded pins 328 extend through the holes 314 and the slots 326 and engage the clinch nuts 316. The pivotable block 300 is then attached to the camera mount 200. The fasteners 306 extend through the aligned slots 22 in the camera mount and engage the clinch nuts 308. A camera (not illustrated) is connected with the fastener 322 to the pivot plate 318. The bolts 328 can be loosened for orienting the pivot plate 318 at a selected angle, whereby the camera can be disposed in a selected plane for recording images. The pins 328 travel in the slots 326 for selective positioning of the pivot plate 318 and are re-tightened to secure the pivot plate at the selected angle.

Figure 9:
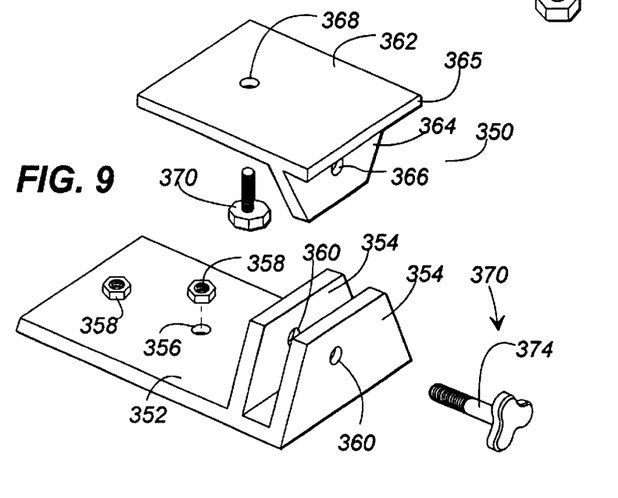
FIG. 9 is a perspective view of an alternate embodiment of a support block for supporting a camera on the camera mount.

FIG. 9 is a perspective view of an alternate embodiment of a pivotable block 350 for supporting a lighter-weight camera on the camera mount 200. The block 350 comprises a base plate 352 having a pair of upwardly extending spaced-apart parallel flanges 354 at a first side. The base plate 352 defines a pair of holes 356 and clinch nuts 358 are coaxially aligned with each. The holes receive fasteners (not illustrated) for securing the block 350 to the camera mount of the present invention. The flanges 354 have a trapezoid shape in end view, with the wider base of the trapezoid integral with the base plate 352. The flanges 354 define coaxially aligned threaded bores 360. A pivot plate 362 includes a depending trapezoid-shaped flange 364 that defines a bore 366. The flange 364 is disposed laterally inward of an edge 365 of the pivot plate 362, whereby the flange can be disposed between the pair of flanges 354. The pivot plate 362 defines a hole 368 for receiving a threaded fastener 370 for engaging a camera to the pivot plate. A bolt 372 having a grippable handle 374 engages the bores 360 in the base plate 352. The pivot plate 362 and the base plate 352 are readily manufactured, such as by extrusion or extruded or molding with minimal machining required.

In operation, the pivot plate 362 engages to the base plate 352 by inserting the flange 364 between the flanges 354 and aligning the bore 366 in the flange 364 with the bores 360 in the flanges 354. The bolt 372 threadingly engages the bores for securing the base plate and the pivot plate together. Although not illustrated, the pivotable block 350 is then attached to one of the camera mounts installed in an automobile. Fasteners engage the clinch nuts 358 to secure the block 350 to the camera mount. A camera is connected with the fastener 370 to the pivot plate 362. The bolt 372 can be loosened for orienting the pivot plate 362 at a selected angle, whereby the camera (not illustrated) can be disposed in a selected plane (preferably horizontal) for recording images.

Figure 10:
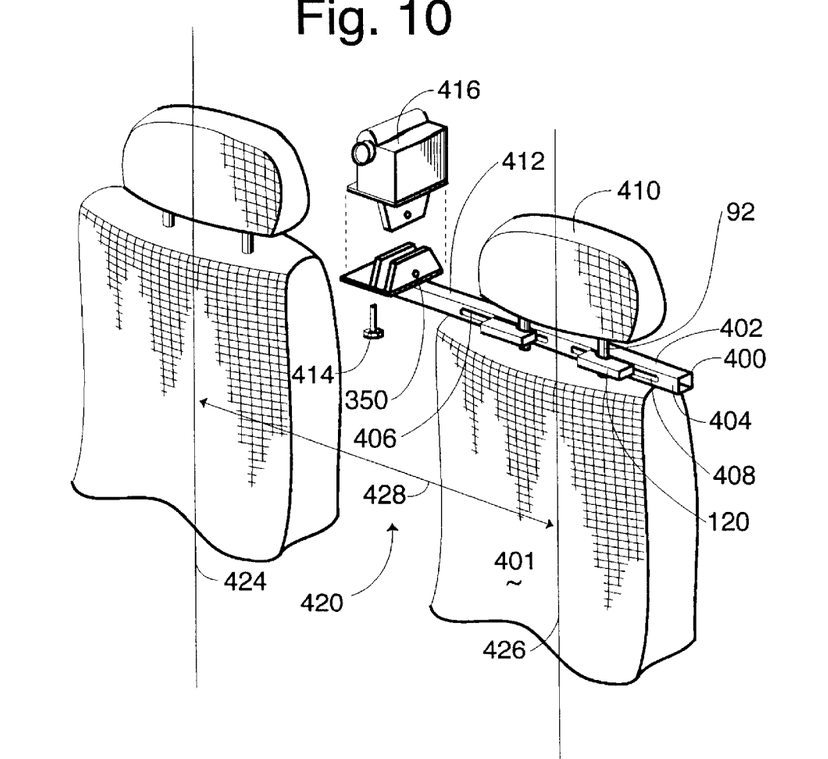
FIG. 10 is a perspective view of an alternate embodiment of the camera mount of the present invention.

FIG. 10 is a perspective view of a camera mount 400 attachable to a seatback 401 of a seat in a vehicle, according to the present invention. The camera mount 400 comprises an elongate tubular body 402 having a bracket mounting surface 404 that defines openings 406, 408 on opposing sides of the body 402 for receiving brackets to engage the camera mount 400 to the supports 92 of a headrest 410. In the illustrated embodiment, the camera mount 400 uses the brackets 120 illustrated in FIG. 2 to engage the openings 406, 408 which are elongated slots extending longitudinally and are coaxial relative to each other. The tubular body 402 extends laterally of the headrest 410 and defines a camera mount surface 412 at a distal end portion laterally of the headrest. The camera mount surface 412 defines an opening for receiving a threaded fastener 414 for securing a camera imaging apparatus 416 to the camera mount 400. In the illustrated embodiment, the pivot block 350 is received on the camera mount surface 412 with a conventional video camera engaged to the pivot block.

The camera mount 400 accordingly disposes imaging apparatus 416 laterally of the seatback between portions of vehicle seats occupied for seating during operation of the vehicle without interference to the camera imaging apparatus 416 receiving images during ordinary use of the seat in the vehicle. The imaging apparatus 416 is positioned substantially centrally relative to a central axis of the vehicle beyond a view point of an eye of an occupant of the seat nearest the centerline of the vehicle such that the imaging apparatus is unobstructed for receiving images by use of the seat. As may be appreciated, the space in which the imaging apparatus 416 is disposed is defined as a middle substantially greater portion 420 of the space between the central axis 424, 426 defining seating portions of the seats represented by the seatbacks 401. This is shown in FIG. 10 by a subdivided line 428 extending between the central axis 424, 426 of the seatback portions of the seats in the vehicle. In the illustrated embodiment, the portion 420 is the substantially middle or central portion of the line 428. In the illustrated embodiment, this middle portion is approximately 60% of the distance between the central axis 424, 426, although this middle portion may vary depending upon the particular seating characteristics. The portion 420 is substantially medial the seating positions, such that the imaging apparatus 416 is positioned substantially centrally relative to a central axis of the vehicle beyond a view point of an eye of an occupant of the seat nearest the centerline of the vehicle such that the imaging apparatus is unobstructed for receiving images by use of the seat. The camera mount 400 in the illustrated embodiment disposes the imaging apparatus 416 on a cantilever mount connected by the brackets 120 to the supports 92 of the headrest 410.

Figure 11:
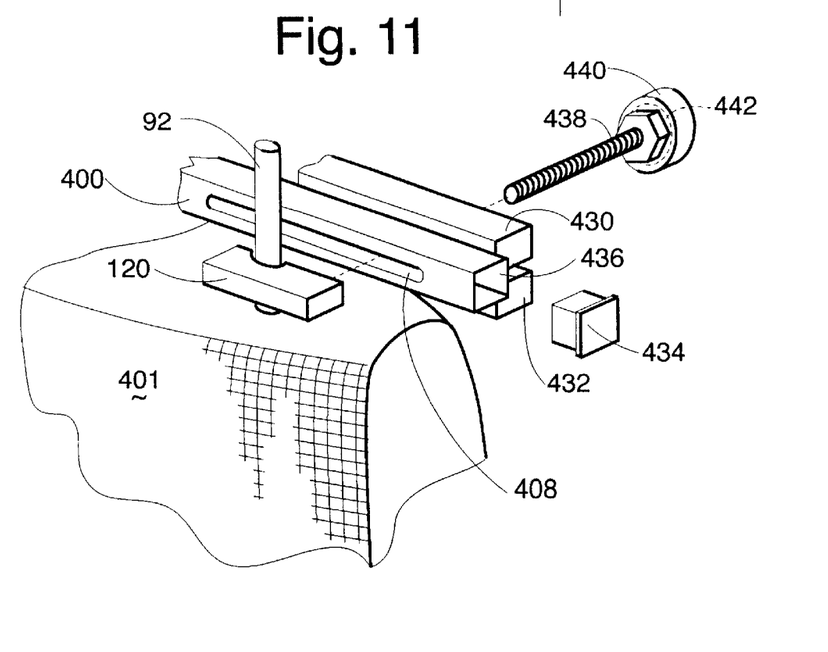
FIG. 11 is a perspective fragmentary view of the camera mount illustrated in FIG. 10, showing features thereof.

FIG. 11 is a perspective fragmentary view of the camera mount 400 illustrated in FIG. 10. A pair of opposing elongate resilient members 430, 432 are attached to outside corners of the camera mount 400. The members 430, 432 are elongate sheets of foam or other suitable cushion material having an adhesive on an inner face for adhering the members to the camera mount 400. A plug 434 preferably made of resilient foam or other suitable cushion material, is slidingly received within an open end 436 of the camera mount 400. The bracket 120 receives a threaded fastener 438 from an opposing side of the camera mount 400 to secure the headrest support 92 between the bracket and the camera mount. A cap 440 having a recess 442 receives the distal end of the fastener 438.

With reference to FIGS. 10 and 11, the camera mount 400 with the cushioned members 430, 432 attaches with the brackets 120 and fasteners 438 to the supports 92 of the headrest 410. The cap 440 cushions the distal end of the fastener 438. The imaging apparatus 416 is secured with a fastener to the mount surface 412 laterally of the headrest 410. In the illustrated embodiment, the pivot plate 350 permits disposing the imaging apparatus at a selected angle, where the angulation of the headrest supports 92 can be compensated, so that the imaging apparatus is oriented to provide a view through the front windshield of the vehicle, whereby images substantially from the perspective of the operator of the vehicle are selective recordable on a recorder included with conventional video cameras or on a recorder disposed within the motor vehicle or elsewhere for receiving signals representative of the images received by the imaging apparatus. The imaging apparatus 416 positioned on the cantilever camera mount 400 substantially centrally relative to a central axis of the vehicle beyond a view point of an eye of an occupant of the seat nearest the centerline of the vehicle such that the imaging apparatus is unobstructed for receiving images by use of the seat. It is to be appreciated that the stabilizer 250 illustrated in FIGS. 6 and 7 is gainfully used with the camera mount 400, whereby vibrations may be dampened for facilitating the reception of images by the imaging apparatus 416. The plug 434 closes the open end 436 of the camera mount 400, for providing a resilient, cushioned end for the camera mount.

The principles, preferred embodiments, and modes of operation of the present invention have been described in the foregoing specification. The invention is not to be construed as limited to the particular forms disclosed because these are regarded as illustrative rather than restrictive. Moreover, variations and changes may be made by those skilled in the art without departure from the spirit of the invention as described by the claims.

What is claimed is:

1. An imaging apparatus mount for use in a motor vehicle to support an imaging apparatus for recording images from the motor vehicle, comprising:

an elongate rigid member for being attached to a seatback of a motor vehicle and having a support surface for disposing an imaging apparatus substantially centrally relative to a central axis of the vehicle beyond a view point of an eye of an occupant of the seat nearest the centerline of the vehicle such that the imaging apparatus is unobstructed for receiving images by use of the seat;

fasteners for securing the imaging apparatus to the support surface;

connectors for connecting the rigid member to respective supports of a headrest of the motor vehicle in which the imaging apparatus mount is installed.

2. The imaging apparatus mount as recited in claim 1, wherein the rigid member is tubular body.

3. The imaging apparatus mount as recited in claim 1, wherein each connector comprises a bracket that receives a fastener for operatively engaging the rigid member to a headrest support in the seatback.

4. The imaging apparatus mount as recited in claim 3, wherein the rigid member defines opposing openings for receiving the bracket and the fastener engaged thereto.

5. The imaging apparatus mount as recited in claim 3, wherein the bracket comprises a j-bolt having a portion extending around a respective one of the headrest supports and having a threaded end which extends through an opening in the rigid member; and the fastener associated with the connector received on the threaded member, whereby the rigid member is connected to the headrest support.

6. The imaging apparatus mount as recited in claim 3, wherein the bracket comprises:

a block defining a notch for receiving a portion of a respective one of the headrest supports; and the fastener associated with the connector being a threaded fastener extending through an opening in the rigid member and engaging the block, whereby the bracket secures the rigid member to the headrest support.

7. The imaging apparatus mount as recited in claim 3, wherein the bracket comprises a block having a side defined by a first face and a second face which are parallel to a plane on a longitudinal axis of the block, said first face disposed in a plane closer to the longitudinal axis than the plane in which said second face is disposed, whereby said side of the block defines a notch therein for receiving a portion of a rectangular headrest support; and the block defining a tapped bore extending partially therein from the second face for receiving the fastener for connecting said imaging apparatus mount to said bracket.

8. The imaging apparatus mount as recited in claim 7, wherein at least one land portion extends laterally from the second face for being received within a mating opening in the rogodmember whereby the extending land restricts the bracket from rotational movement while the fastener associated with the connector is attached to the bracket.

9. The imaging apparatus mount as recited in claim 1, the fasteners for securing the imaging apparatus comprising:

a pivot plate pivotally connected to the imaging apparatus support surface for receiving the imaging apparatus;

means for locking the pivot plate at a selected angle relative the support surface, whereby the imaging apparatus can be selectively tilted for adjusting the angle of the imaging apparatus view for recording images.

10. The imaging apparatus mount as recited in claim 9, wherein the pivot plate comprises:
   a support adapted for being connected to the rigid member; and
   a plate member pivotally connected to the support for receiving the imaging apparatus thereon.

11. The imaging apparatus mount as recited in claim 10, wherein the support defines an opening for receiving a bolt for connecting the support to the support surface.

12. The imaging apparatus mount as recited in claim 10, wherein the support surface defines a slot substantially parallel to the longitudinal axis of the rigid member; and
   further comprising a connector that extends through the slot and engages the support for selectively positioning the plate member longitudinally along the rigid member.

13. The imaging apparatus mount as recited in claim 1, further comprising a support for stabilizing the imaging apparatus, comprising:
   a support plate defining a planar surface for supporting a camera thereon;
   at least one lateral side extending from the plate;
   the support plate defining a central threaded bore for receiving a fastener therein for connecting the support plate to the fasteners for securing the imaging apparatus;
   at least one pin connected to the lateral side in a first distal portion of the support plate;
   a telescopically extendable tube attached to the pin for pivotal movement about the pin, said tube being extendable to a selected length at a selected angle for a distal end to bear against a surface of the automobile; and
   means for securing a camera to the support plate.

14. The imaging apparatus mount as recited in claim 1, wherein the fasteners for securing the imaging apparatus comprises:
   a base plate with a pair of opposing sides extending therefrom;
   connector means for attaching the base plate to the support surface;
   each side defining a first opening near the base plate and a second opening distal from the base plate;
   a nut coaxial with each of the second openings;
   a pivot member with a pair of opposing sides which each define a pivot openings and an arcuate slot concave towards the base plate, and camera connecting means for attaching a camera to the pivot plate;
   a pair of pins, each received through a respective one of the pivot openings of the pivot member and a respective one of the first openings in the base plate, whereby the pivot member pivots relative to the base plate about the pins; and
   at least one threaded pin extending through one of the arcuate slots of the pivot member and an aligned one of the second openings of the base plate and engaging the nut, whereby the pivot movement of the pivot member is guided by the threaded pin traveling relative to the arcuate slot and the pivot member is secured in a selected position by tightening the threaded pin to the nut.

15. The imaging apparatus mount as recited in claim 1, the fasteners for securing the imaging apparatus comprising:
   a base plate with a pair of spaced-apart flanges extending from a first side portion of the base plate, and at least one of the flanges defining a bore;
   connectors for attaching the base plate to the support surface;
   a pivot member with a pivot flange extending therefrom and received between the spaced-apart flanges of the base plate, the pivot flange defining a threaded bore coaxial with the bore in the at least one flange of the base plate, and engaging means for attaching the imaging apparatus to the pivot member; and
   a threaded fastener extending through the bore in the at least one flange of the base plate and engaging the threaded bore in the pivot flange, whereby the pivot member is moveable to a selected angle relative to the base plate and secured thereat by tightening the threaded fastener to the pivot member,
   whereby the imaging apparatus, being attached to the pivot member, is positionable at a selected angle for recording images.

16. A method of securing an imaging apparatus in a vehicle for recording images from the vehicle, comprising the steps of:
   (a) attaching an elongated rigid member to a pair of headrest supports extending from a seatback of a vehicle, the rigid member defining a support surface defining an opening for receiving a fastener for engaging an imaging apparatus thereto and defining second openings for receiving brackets to secure said member to the headrest supports;
   (b) disposing the imaging apparatus to the support surface substantially centrally relative to a central axis of the vehicle beyond a view point of an eye of an occupant of the seat nearest the centerline of the vehicle such that the imaging apparatus is unobstructed for receiving images by use of the seat.

17. The method as recited in claim 16, further comprising the steps of:
   (c) attaching a pivot plate to the rigid member disposed between the support surface and the imaging apparatus, whereby said pivot plate is selectively tilted for adjusting the angle of the view for recording images; and
   (d) locking the pivot plate in a selected angle relative the support surface,
   whereby the imaging apparatus, connected to the pivot plate, is selectively positioned for recording images.

18. The method as recited in claim 16, further comprising the step of stabilizing the centerally disposed imaging apparatus by extending a telescoping member from a device disposed on the rigid member which supports the imaging apparatus to a support surface in the vehicle.

* * * * *